Patented Feb. 12, 1929.

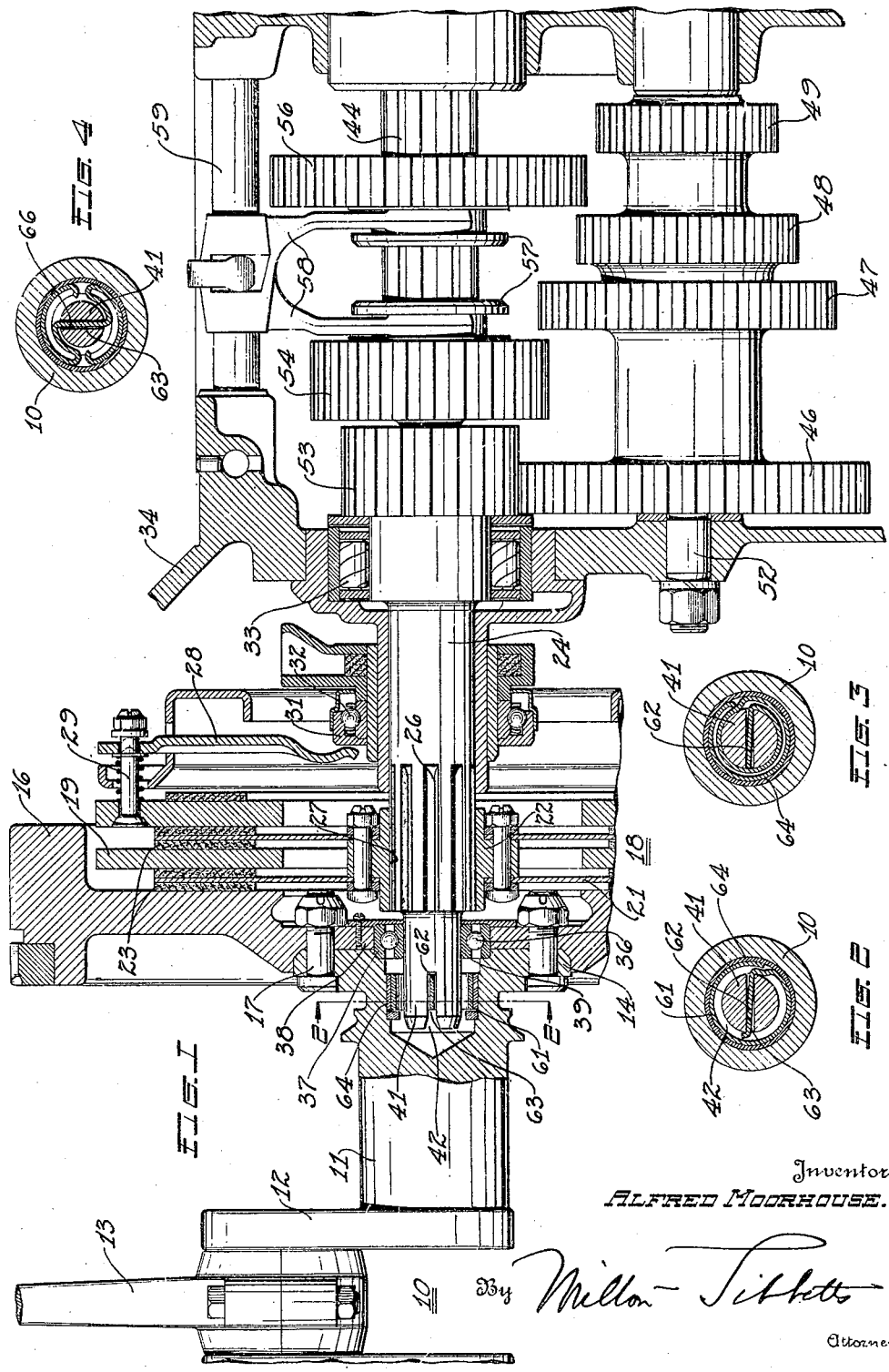

1,701,586

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

BRAKE FOR TRANSMISSION.

Application filed November 7, 1927. Serial No. 231,526.

This invention relates to motor vehicles and more particularly to the transmission mechanism of such vehicles, and it has for its principal object to provide means whereby free rotation or spinning of the clutch and its associated parts shall be reduced or prevented, and the operation of gear changing be thereby facilitated.

Another object of the invention is to provide a motor vehicle transmission with a clutch brake which shall be automatically operative upon overrunnning of the clutch shaft.

Another object of the invention is to provide a transmission mechanism having an automatic clutch brake which is operative to reduce the speed of the clutch parts to the idling speed of the crankshaft by frictional connection therewith.

Another object of the invention is to provide a transmission mechanism for motor vehicles with a simple, efficient and inexpensive clutch brake.

A further object of the invention is to provide such a mechanism which may be operated for long periods under adverse conditions without excessive wear and heating.

Other objects of the invention will appear from the following description taken in connection with the drawing, which forms a part of this specification, and in which:

Fig. 1 is a view, partially in longitudinal section and partially in side elevation, of part of a motor vehicle engine and transmission mechanism embodying this invention;

Fig. 2 is a transverse section taken substantially on the line 2—2 of Fig. 1, and Figs. 3 and 4 are sectional views similar to Fig. 2, showing other forms of the invention.

In the sliding type of selective transmission which is in common use on motor vehicles today, it has been found that the driven element, including the clutch shaft, the driven clutch discs and some of the gears, frequently rotates freely or spins for a considerable period after being freed from the crankshaft by disengagement of the clutch. As it is essential to smooth and quiet gear shifting that the gears to be engaged have approximately the same peripheral speed, such spinning necessitates a considerable pause between the disengagement of one set of gears and the engagement of another, while the spinning elements slow down to the proper speed. This makes gear shifting a delicate and somewhat tedious operation, and prevents rapid shifting from one gear to another, which is frequently desirable or even imperative, especially in the handling of a vehicle in traffic. Considerable damage to gear teeth and other parts of the transmission mechanism has resulted from the forcible engagement of gears not rotating at the proper speeds, when the exigencies of vehicle operation have demanded an immediate shift.

However, upon throttling the engine down to idling speed preparatory to shifting gears, the crankshaft slows down very rapidly, and it has been previously proposed, and has become common practice, to "double clutch" when a rapid shift of gears is desired. In double clutching, the clutch is momentarily re-engaged while the gears are in neutral or unmeshed position, which has the effect of momentarily connecting the clutch shaft to the engine crankshaft after the latter has slowed down to an idling speed. The clutch and the crankshaft are thus used as a brake to reduce the speed of the clutch shaft and the transmission. If this operation is performed with precision it secures the desired result but the practice requires considerable skill and becomes quite laborious when frequently performed, as in traffic.

Various mechanical means have also been proposed for slowing down the spinning clutch shaft, in which a stationary brake is manually applied to the moving elements through some device such as the clutch release mechanism, which is under the control of the vehicle operator. Such devices, however, have been clumsy and inefficient, mechanically weak, and expensive to build and maintain.

Referring to the accompanying drawing, at 10 is shown an engine crankshaft having journaled portions 11 by which it is rotatably mounted in suitable bearings (not shown), and having cranks 12 adapted to be driven in the well known manner by connecting rods 13. The rear end of the shaft 10 has an integral flange 14, to which a fly-wheel 16 is secured as by bolts 17.

In line with the crankshaft 10 is a friction clutch 18 of conventional construction, having driving elements or plates 19 which are driven from the crankshaft in any convenient way, and driven plates or elements 21 which are secured to a hub member 22. These driven plates 21 are provided with suitable friction material 23 in the well known manner to secure frictional engagement between the driving and the driven elements. The hub 22 is mounted on a driven or clutch shaft 24 which is splined as at 26, to cooperate with splines 27 in the bore of the hub 22, whereby the hub and shaft will rotate together and the hub may slide on the shaft. The driving and driven members of the clutch 18 are urged axially into engagement by the usual clutch springs, which hold the friction facings 23 in contact to secure a driving connection. Suitable means is also provided for separating the driving and driven members, to disengage the clutch. As illustrated, this comprises a number of fingers 28 which form levers adapted to move the clutch members axially on the splines 26 against the action of the clutch springs. The inner ends of the fingers 28 engage the outer race 31 of a clutch-operating or throw-out bearing 32, which is adapted to slide axially of the shaft 24, and is moved by suitable levers (not shown), actuated by the vehicle operator in the usual way. As clutches of this nature are well known in the art to which this invention relates, further description thereof is unnecessary.

The clutch shaft 24 is journaled rearwardly of the splines 27 in a suitable bearing 33 provided in the front end wall in the transmission gear case 34, and near its forward end it is supported in an annular bearing 36, the outer race 37 of which is secured against the inner edge 38 of the flywheel 16. The inner race 39 of the bearing 36 cooperates with a reduced portion 41 at the forward end of the shaft 24, which portion projects into a recess or opening 42 in the end of the crankshaft 10. The rear end of the shaft 24 projects through the bearing 33 into the gear housing 34.

The transmission gearing within the housing 34 is of conventional form and includes a splined transmission shaft 44, coaxial with the clutch shaft, and a countershaft parallel thereto. The countershaft consists of a cluster of gears 46, 47, 48 and 49, mounted on a stationary shaft or arbor 52 in the housing 34, and driven from a gear 53 on the rear end of the clutch shaft 24 which is in constant mesh with the gear 46. The splined shaft 44 carries a pair of gears 54 and 56, which are rotatable with the shaft and are also slidable thereon, and which may be meshed with the gears 47 and 48 respectively to vary the reduction ratio of the gearing. For this purpose they are provided with grooved collars 57, actuated by shifter forks 58, and these forks are carried by and moved with slidable shifter rods 59 which may be selectively actuated by the operator of the vehicle.

The gear 54 is also provided with internal teeth (not shown) by which it may connect to the gear 53 to provide a direct drive, and the gear 56 may be meshed with a reverse pinion (not shown) driven from the gear 49 to change the direction of rotation of the shaft 44. The rear end of the shaft 44 is connected to the propeller shaft of the vehicle in the usual manner. As gearing of this type is well known in the art to which this invention relates, no further description thereof is necessary.

When it is desired to shift gears, the engine is throttled to idling speed, the clutch 18 is disengaged, and the shifter rods are moved to bring the transmission gears out of engagement into neutral or unmeshed position. At this time, the clutch shaft 24, the driven clutch elements, and the countershaft gear cluster are disconnected from both the engine and the propeller shaft, so that they are free to rotate in their various bearings until they are slowed down by bearing friction, and by the resistance of oil in the gear housing. To prevent the prolonged spinning of these elements this invention provides a simple and effective brake, which is entirely automatic in its action.

For this purpose a resilient brake member is operatively mounted between the crankshaft 10 and the clutch shaft 24. In the embodiment illustrated this comprises a spiral spring member 61 disposed within the recess 42 in the crankshaft, and having at its inner end a straight portion 62 which is fitted in an axial notch 63 formed in the reduced portion 41 at the forward end of the clutch shaft. The coiled portion of the member 61 bears for the greater portion of its outer surface on the circumferential surface of the recess 42, or the recess may be provided as shown with a bushing 64 of any suitable material in frictional engagement with the member 61. It is evident that the resilient member 61 will expand within the recess 42 and will thus exert radial pressure against the surface of the recess, or against the bushing 64, and any relative rotation between the crankshaft 10 and the clutch shaft 24 will be opposed by the frictional resistance of this contact. The friction thus acts to retard or brake the free rotation of the clutch shafts and its associated members, so that spinning thereof is prevented.

The resilient member 61 is easily deformable and its spiral curve is disposed in a direction such that it will tend to wrap up and thus decrease its diameter when the speed of the crankshaft 10 exceeds the speed of the shaft 24, but will tend to unwrap or increase in diameter when the speed of the shaft 24 exceeds that of the crankshaft 10. Thus it will be evident that when the clutch shaft 24 overruns the crankshaft the relative rotation between the shafts will tend to expand the resilient member 61 and increase the friction between this member and its cooperating bushing 64, thus exerting a force acting to decrease the speed of the shaft 24. On the other hand, with the clutch disengaged and the engine running at a speed such that the crankshaft is turning more rapidly than the clutch shaft, as when starting the vehicle from rest, the resilient brake member 61 will tend to wrap up or decrease its diameter and thus reduce the frictional drag on the crankshaft. In this way a differential friction effect is secured, providing fully automatic braking of the clutch shaft and the associated parts.

The heat produced by the friction between the member 61 and the cooperating bushing 64 is readily conducted through the crankshaft flange 14 into the flywheel 16 and dissipated therefrom by radiation, so that there is not an excessive temperature rise in the parts even upon the most severe conditions of operation, such as coasting the vehicle with the gears in mesh and the clutch held in its disengaged position.

In Fig. 3 is shown a modified form of the invention in which the resilient brake member is formed with a double loop, the inner convolution of which closely embraces the portion 41 of the shaft while the outer loop or coil is adapted to frictionally contact the bushing 64, as previously described. This form of brake member secures a softer and more resilient action and more uniformly distributed pressure over the brake surface.

A still better distribution of the brake pressure is secured in the form of the invention shown in Fig. 4, in which the resilient element is divided into two loops or sections, joined by a straight portion 66 which is disposed within the slot 63. The two contact portions of the braking member in this form of the invention are also arranged to wrap in the same direction.

It will be evident that this device provides a simple and reliable means to prevent the spinning of the clutch shaft and its associated parts, which is fully automatic in its operation, thus dispensing with the necessity for manual control on the part of the vehicle operator.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

Having thus described the invention, what is claimed and desired to be secured by Letters Patent is:

1. The combination with a transmission mechanism having associated shafts independently rotatable, of a brake carried by one of the shafts including a member frictionally engaging the other shaft.

2. The combination with a transmission mechanism having shafts and a clutch for connecting said shafts, of means including a spring carried by one of said shafts and frictionally engaging the other shaft to retard independent rotation of the first shaft.

3. The combination with a transmission mechanism having a pair of alined shafts, of a spring member attached at the end of one shaft and having a portion frictionally engaging the other shaft to provide a differential braking effect between said shafts.

4. The combination with a transmission mechanism having relatively rotatable members of a brake device between said members deformable to vary the brake effect in accordance with the relative rotation of said members.

5. The combination with a mechanism having rotatable members, of a resilient friction device between said members deformable to vary the friction effect in accordance with the relative rotation of said members.

6. The combination with a transmission mechanism having driving and driven shafts and a clutch for connecting said shafts, of a resiliently expansible member secured to the driven shaft and frictionally engaging the driving shaft to increase the friction when the driven shaft overruns the driving shaft.

7. The combination with a transmission mechanism having a drive shaft, a driven shaft, and a clutch between said shafts, of a brake for said driven shaft including a member frictionally connecting said shafts and deformable to differentiate the friction in accordance with the relative speed of said shafts.

8. The combination with a transmission mechanism having a drive shaft, a driven shaft, and a clutch for connecting said shafts, of a brake for said driven shaft including a resilient member operable to oppose rotation of the driven shaft at a higher speed than the driving shaft.

9. The combination with a transmission mechanism including a shaft having a recess in the end thereof and an associated shaft projecting into said recess, of a spiral spring carried by the associated shaft and engaging the wall of said recess, said spring being radially deformable to vary the friction in accordance with the relative rotation between the shafts.

10. The combination with a transmission mechanism having a pair of aligned shafts of a spiral spring member attached at its end to one shaft and having the periphery of its outer coil in frictional engagement with the other shaft, said coil being so disposed as to expand when the first said shaft overruns the other shaft.

11. The combination with a transmission mechanism having aligned driving and driven shafts and a clutch for connecting said shafts, of a spiral spring secured to the driven shaft and frictionally engaging a part of the other shaft, said spring tending to expand when the driven shaft overruns the driving shaft upon disengagement of the clutch.

12. The combination with a transmission mechanism including a shaft having a recess in the end thereof and an associated shaft having a portion projecting into said recess, of a bushing in said recess, and a spiral spring connected to the end of the associated shaft and surrounding said end to frictionally engage said bushing.

13. The combination with a transmission mechanism including a shaft having a recess in the end thereof, and an associated shaft having a portion projecting into said recess and having an axially disposed notch in said portion, of a spiral spring radially expansible into frictional engagement with the recess having a straight portion at its inner end adapted to seat in said notch.

14. The combination with a transmission mechanism including a shaft having a recess in the end thereof, and an aligned shaft extending into said recess and having an axially disposed notch, of a spring member secured in said notch having a portion frictionally engaging the recess.

15. The combination with a transmission mechanism having a driving shaft, a driven shaft, and a clutch between the shafts, of a brake device between the shafts to slow down the spinning action of the driven shaft.

16. The combination with a transmission mechanism having a driving shaft, a driven shaft, and a clutch between the shafts, of a differential brake device between the shafts permitting overrunning of the driving shaft and braking the overrunning of the driven shaft.

17. The combination with a transmission mechanism having a driving shaft and a driven shaft, of a brake device between said shafts automatically operable to permit overrunning of the driving shaft and to retard overrunning of the driven shaft.

18. The combination with a transmission mechanism having a driving shaft, a driven shaft, and a clutch between the shafts, of a brake device mounted on and secured to the driven shaft and engaging the driving shaft to automatically reduce the speed of the driven shaft to the speed of the driving shaft upon disengagement of the clutch.

In testimony whereof I affix my signature.

ALFRED MOORHOUSE.